United States Patent
Terada et al.

[19]

[11] Patent Number: 6,160,324
[45] Date of Patent: Dec. 12, 2000

[54] DEADMAN SWITCH MECHANISM FOR EMERGENCY STOP OF ROBOT AND TEACHING OPERATION

[75] Inventors: Akihiro Terada, Fujiyoshida; Mitsuhiro Yasumura, Minamitsuru-gun; Shinsuke Nakao, Oshino-mura, all of Japan

[73] Assignee: Fanuc Ltd., Yamanashi, Japan

[21] Appl. No.: 09/297,148

[22] PCT Filed: Aug. 25, 1998

[86] PCT No.: PCT/JP98/03772

§ 371 Date: Apr. 26, 1999

§ 102(e) Date: Apr. 26, 1999

[87] PCT Pub. No.: WO99/10138

PCT Pub. Date: Mar. 4, 1999

[30] Foreign Application Priority Data

Aug. 25, 1997 [JP] Japan .................................. 9-241751

[51] Int. Cl.[7] .................................................. H01H 3/16
[52] U.S. Cl. ........................... 307/116; 200/47; 307/125; 307/119
[58] Field of Search ............................. 200/47, 313, 518, 200/52, 298, 293.1, 332.1, 1 R, 5 R; 307/116, 119, 125; 318/568.1, 568.11, 568.12, 568.13

[56] References Cited

U.S. PATENT DOCUMENTS

| | | | |
|---|---|---|---|
| Re. 36,631 | 3/2000 | Tanabe et al. ..................... | 318/569.13 |
| 4,697,979 | 10/1987 | Nakashima et al. ................ | 414/786 |
| 4,990,729 | 2/1991 | Toyoda et al. ..................... | 200/298 |
| 5,212,433 | 5/1993 | Yasuyuki .......................... | 200/5 R |
| 5,319,250 | 6/1994 | Windsor ............................ | 307/116 |
| 5,340,202 | 8/1994 | Day .................................. | 303/19 |
| 5,363,474 | 11/1994 | Saragaku et al. .................. | 395/91 |
| 5,396,122 | 3/1995 | Nesper ............................. | 307/125 |
| 5,748,854 | 5/1998 | Watanabe et al. ................. | 318/568.16 |
| 5,783,922 | 7/1998 | Hashimoto et al. ................ | 318/568.14 |
| 5,892,301 | 4/1999 | Warnatz ............................ | 307/119 |
| 5,964,313 | 10/1999 | Guy .................................. | 180/332 |

FOREIGN PATENT DOCUMENTS

| | | |
|---|---|---|
| 60-191301 | 9/1985 | Japan . |
| 61-153244 | 9/1986 | Japan . |
| 1-92080 | 4/1989 | Japan . |
| 6-278069 | 10/1994 | Japan . |
| 9-85660 | 3/1997 | Japan . |

*Primary Examiner*—Stephen W. Jackson
*Assistant Examiner*—Roberto Rios
*Attorney, Agent, or Firm*—Staas & Halsey LLP

[57] ABSTRACT

A deadman switch mechanism and a teaching operation panel equipped with the deadman switch mechanism, in which possibility of losing a safety function is low even if failure happens in a contact or other elements of a circuit. When an operator grips at least one of grip levers (GL1; GL2) with normal force, the grip levers turn around axes (AX4; AX5), shoulder portions (SD1; SD2) abut on slave levers (SL1; SL2) and turns the slave levers connected by a link (LK) around an axis (AX3) in the direction denoted by an arrow B, simultaneously, so that switches (SW1; SW2) are turned into an ON-state, simultaneously. Then, two circuits including those switches, respectively, output ON-signals independently and these signals are subjected to AND process, to allow the robot to operate. In an emergency, when an operator releases gripping of the grip levers (GL1; GL2), the slave levers (SL1; SL2) turn in the direction denoted by an arrow A, simultaneously, so that the switches (SW1; SW2) are brought into an OFF-state, simultaneously, and the robot stops immediately.

9 Claims, 16 Drawing Sheets

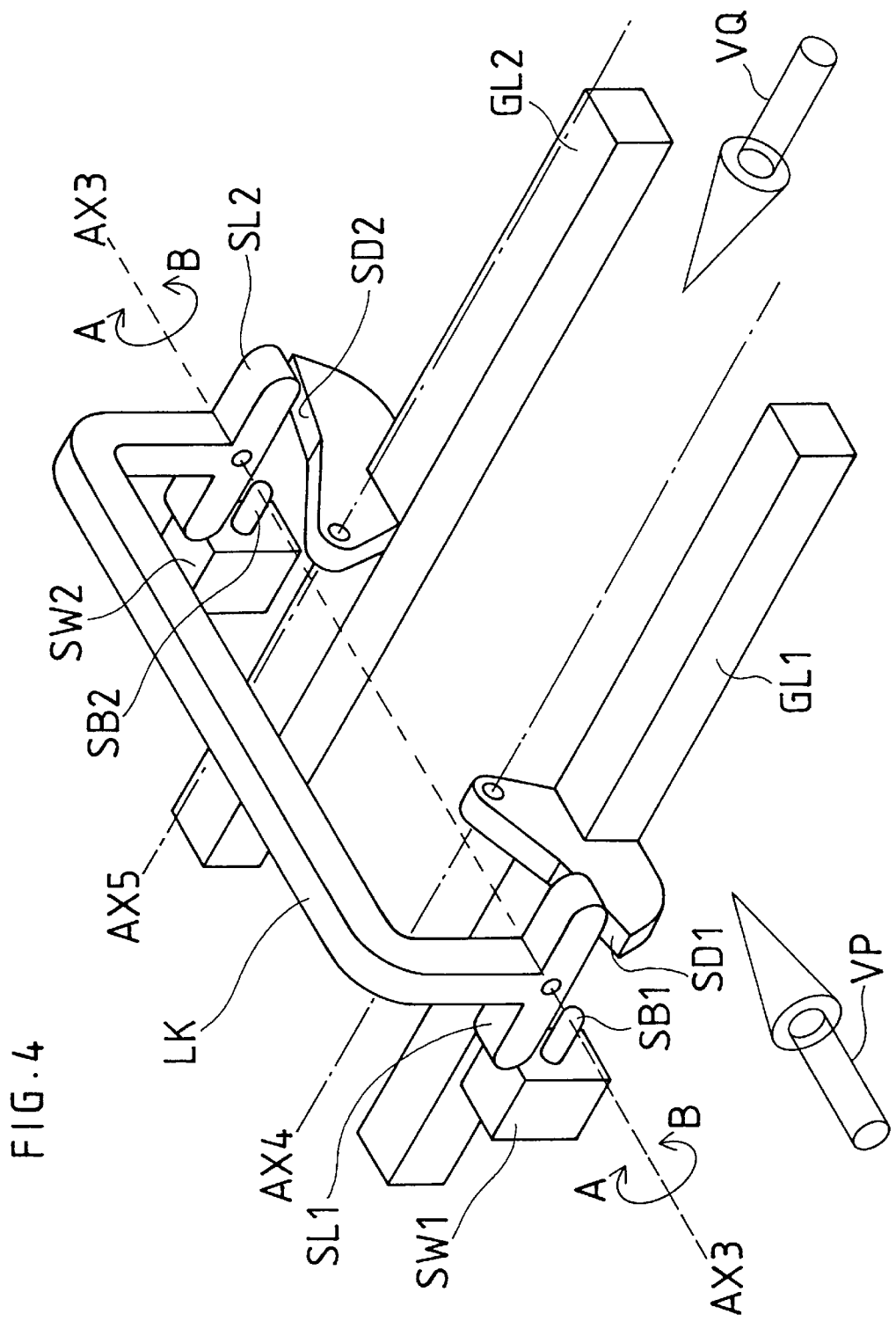

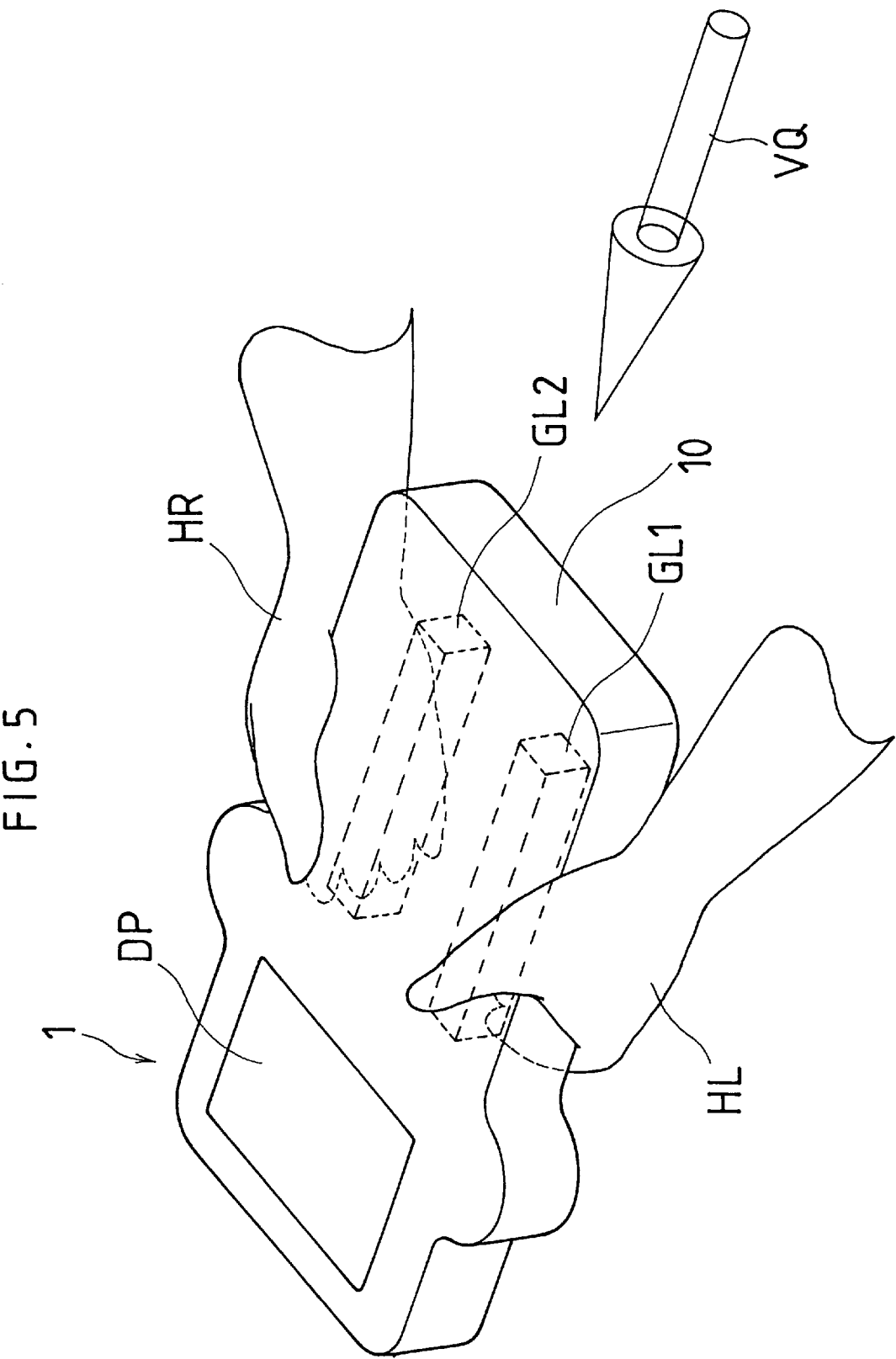

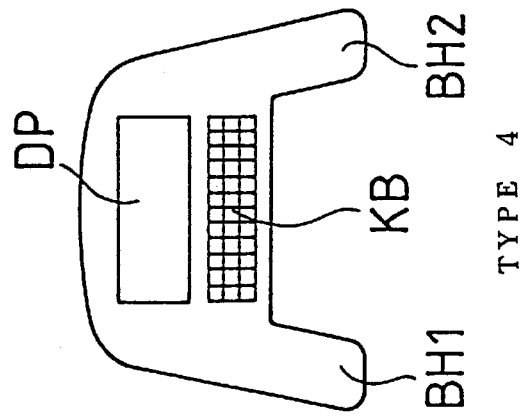
FIG. 8d  TYPE 4
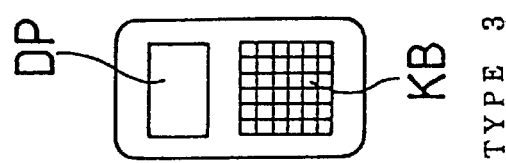
FIG. 8c  TYPE 3
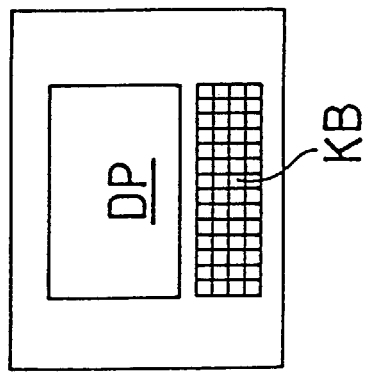
FIG. 8b  TYPE 2
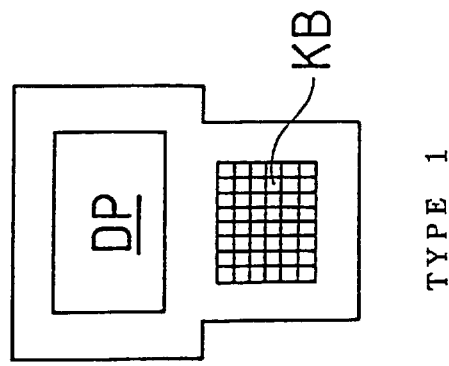
FIG. 8a  TYPE 1

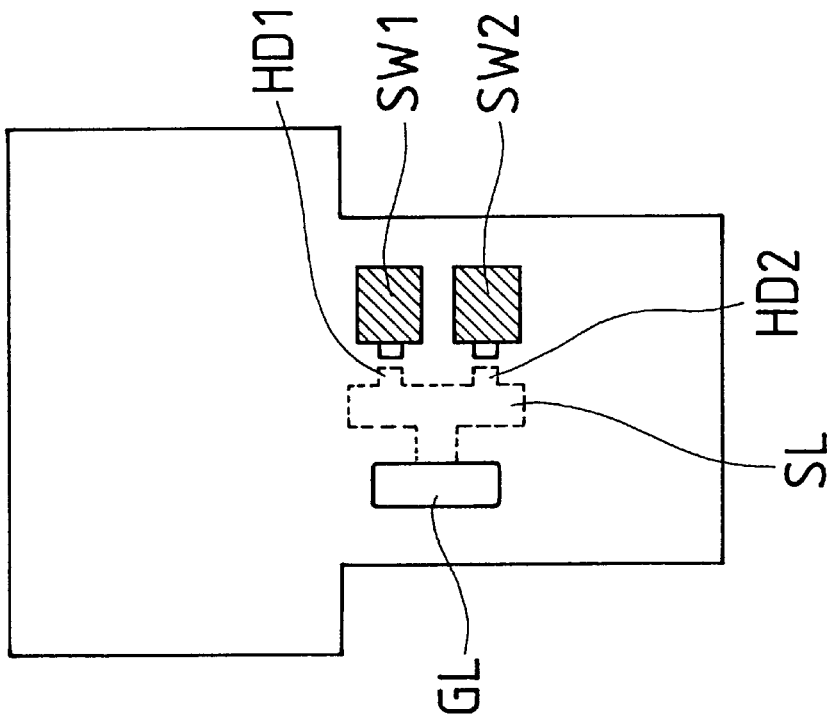
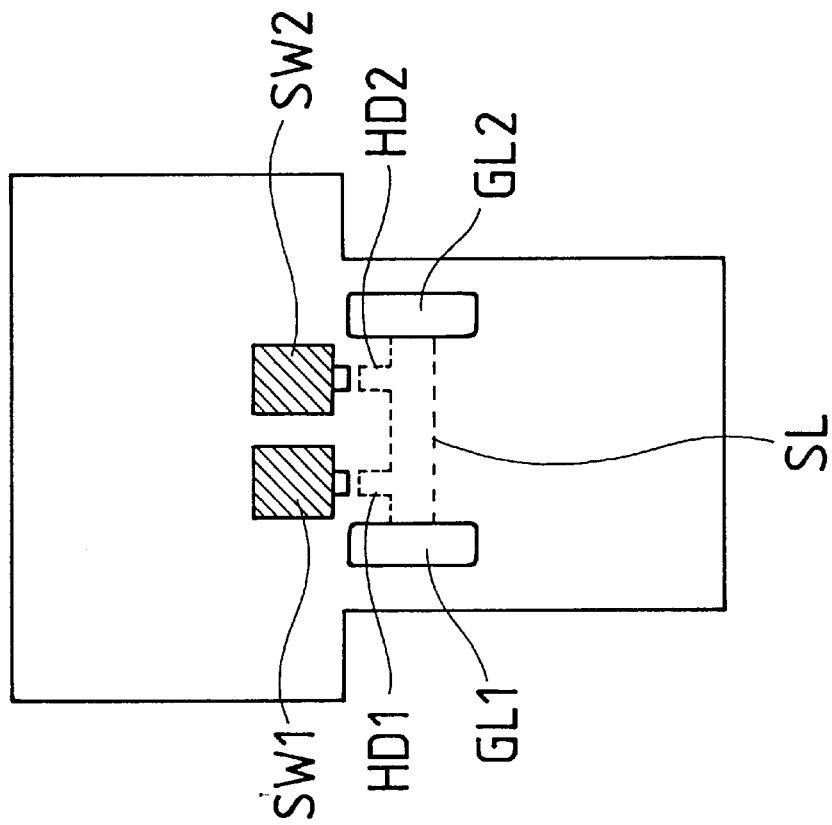

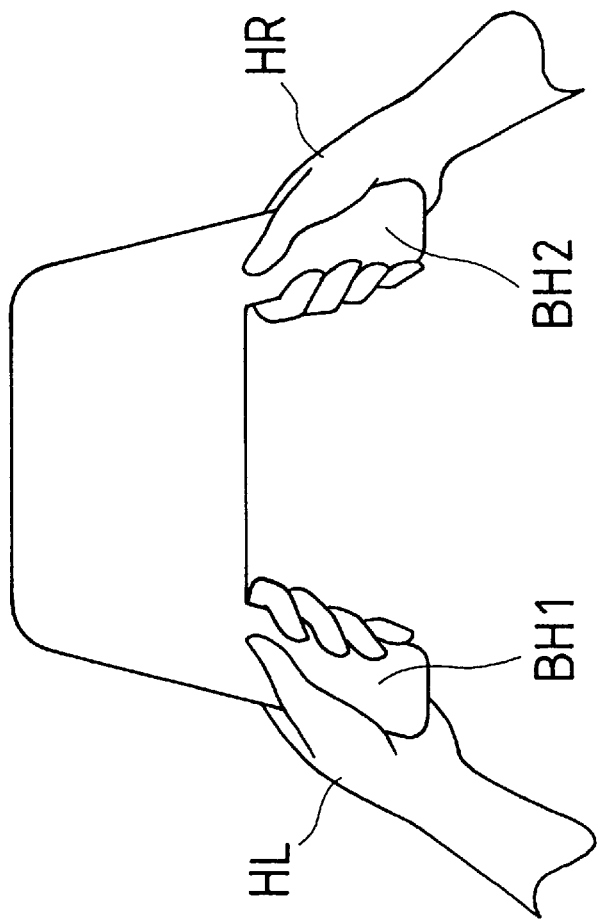
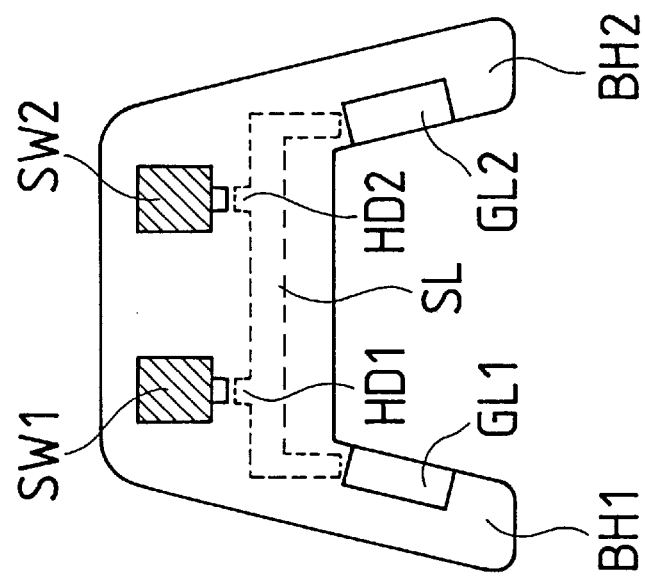

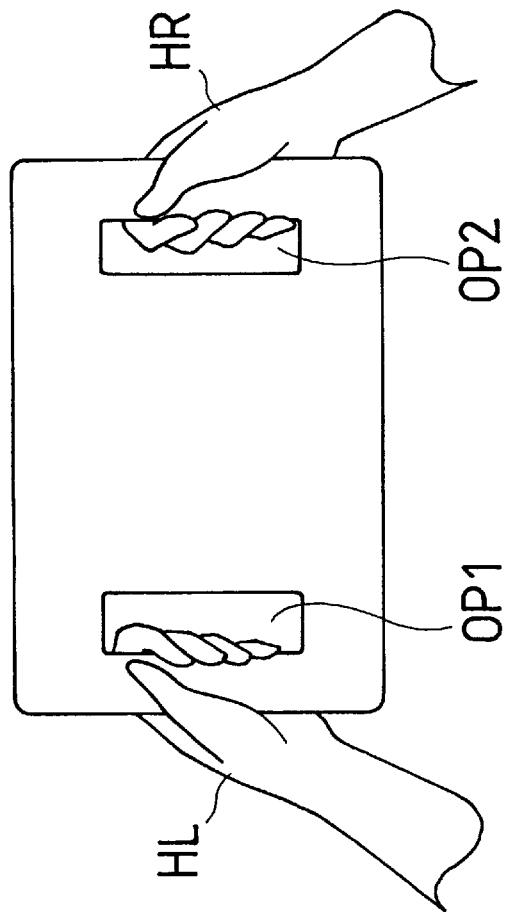
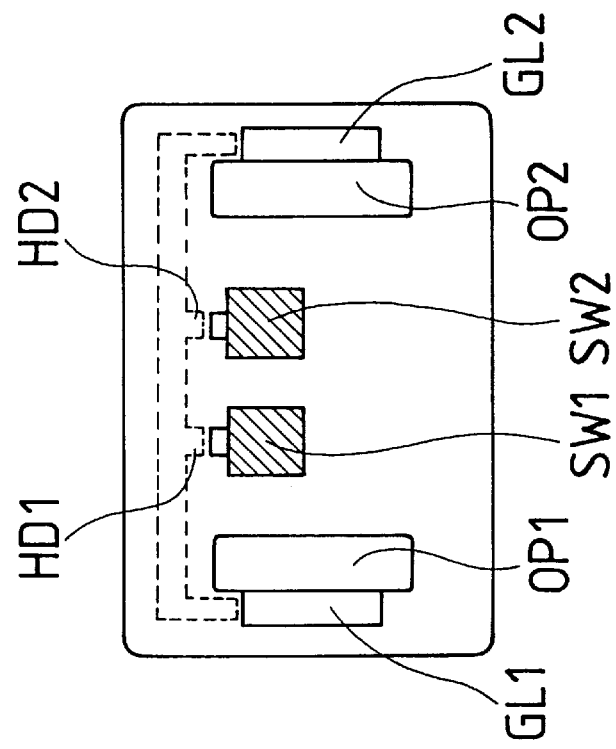
FIG. 13a
FIG. 13b

| STATE | 1 | 2 | 3 | 4 |
|---|---|---|---|---|
| STATE OF SW1 | OPEN | CLOSE | OPEN | CLOSE |
| STATE OF SW2 | OPEN | CLOSE | CLOSE | OPEN |
| OUTPUT OF CIRCUIT 1 | OFF | ON | OFF | ON |
| OUTPUT OF CIRCUIT 2 | OFF | ON | ON | OFF |
| OUTPUT OF AND-CIRCUIT | OFF | ON | OFF | OFF |
| ROBOT OPERATION | PROHIBITED | ALLOWED | PROHIBITED | PROHIBITED |

# DEADMAN SWITCH MECHANISM FOR EMERGENCY STOP OF ROBOT AND TEACHING OPERATION

TECHNICAL FIELD

The present invention relates to a deadman switch mechanism for an emergency stop of a robot and a teaching operation panel having the deadman switch mechanism.

BACKGROUND ART

As a switch mechanism for effecting an emergency stop of a robot, a so-called deadman switch mechanism is known. Usually, the deadman switch mechanism is provided in a teaching operation panel which is connected to a robot controller. An operator holds the teaching operation panel, applies external operating force (pushing, holding or the like) to a handling member (lever, button, knob, handle or the like) of the deadman switch, and in that state, operates a robot manually.

FIGS. 1a and 1b show an example of basic structure of a switch switching mechanism used in a conventional deadman switch. FIG. 1a shows the switch switching mechanism to which external operating force is not applied, and FIG. 1b shows the switch switching mechanism to which external operating force is applied. In this example, a switch SW having a switch button SB as a movable contact element is provided in a teaching operation panel, and the switch button SB is brought into an ON- or OFF-state by a lever L.

With a known mechanism, the lever L which is a handling member is pivoted to turn around an axis AX, and biased in the direction denoted by an arrow A by appropriate biasing force. The force application face FS of the lever L to which external operating force is to be applied is exposed outside the teaching operation panel so that an operator can apply external operating force thereto (push the force application face by a finger tip).

The switch SW is normally open. When external operating force is not applied to the switch SW as shown in FIG. 1a, a known circuit including the switch SW does not send out an ON-signal. In order to operate a robot, the operator needs to push the force application face FS of the lever L to turn the lever L in the direction denoted by an arrow B to thereby push the switch button SB as shown in FIG. 1b. In that state, the circuit including the switch SW sends out an ON-signal to allow the robot to operate. Thus, the operator can operate the robot. Maintaining the state of FIG. 1b, the operator can continue operating the robot.

When the operator wants to stop operating the robot because he feels danger while operating the robot or for another reason, the operator stops pushing the lever L (the force application face FS) (for example, takes his finger tip off) to bring the switch SW back into the state of FIG. 1a to thereby prohibit the robot from operating.

The deadman switch mechanism in which one switch and one circuit are combined as described above has a serious problem in the way of safety. If trouble happens to a contact of such one switch or the circuit including such one switch, there is a risk that the robot may not be prohibited from operating though the operator stops pushing the lever L (the force application face FS), that is, the deadman switch may not do its most important function.

In order to solve the problem, (1) combining two switches and one circuit, or (2) combining two switches and two circuits has been already proposed. FIGS. 2a and 2b show an example of basic structure of a switch switching mechanism having two switches. FIG. 2a shows the switch switching mechanism to which external operating force is not applied, and FIG. 2b shows the switch switching mechanism to which external operating force is applied.

In this example, two switches SW1, SW2 having switch buttons SB1, SB2, respectively, are provided in a teaching operation panel. The switch button SB1 is brought into an ON- or OFF-state by a lever L1, and the switch button SB2 is brought into an ON- or OFF-state by a lever L2.

With known mechanisms, the levers L1, L2 are separately pivoted to turn around axes AX1, AX2, respectively, and biased in the direction denoted by an arrow A by appropriate biasing force. The force application faces FS1, FS2 of the levers L1, L2 to which external operating force is to be applied are exposed outside the teaching operation panel so that the operator can apply external operating force thereto (push the faces by finger tips). The levers L1, L2 are provided to handle the switches SW1, SW2, separately. When the lever L1 is pushed, the switch SW1 comes into an ON-state (without producing any effect on the switch SW2), and when the lever L2 is pushed, the switch SW2 comes into an ON-state (without producing any effect on the switch SW1).

In combining such two switches SW1, SW2 with one circuit, the following two modes, mode 1 and mode 2 are conceivable:

Mode 1; allowing a robot to operate on the condition that both of the switches SW1, SW2 are on (in FIG. 2b, "and" of "and/or" is effective).

Mode 2; allowing a robot to operate on the condition that at least one of the switches SW1, SW2 is on (in FIG. 2b, "or" of "and/or" is effective).

In mode 1, the operator needs to continue pushing the two levers L1, L2 simultaneously in order to operate the robot. This makes it very hard to handle other handling members of the teaching operation panel (for example, to handle a jog feeding button). Therefore, mode 2 is adopted, but if trouble happens to contacts of the switches or the circuit including the switches, mode 2 has the same risk as the above mentioned case in which one switch and one circuit are combined.

Specifically, there is a risk that due to some trouble, a contact or another part of the circuit may malfunction, so that the robot may not be prohibited from operating though the operator stops pushing the lever L1 or L2 (the force application face FS1 or FS2), that is, the deadman switch may not do its most important function.

In combining two switches SW1, SW2 with two separate circuits (referred to as "circuit 1" and "circuit 2"), respectively, the following two modes, mode 3 and mode 4 are conceivable as to how to deal with the outputs of the circuits:

Mode 3; allowing a robot to operate on the condition that both of the switches SW1 and SW2 are on (circuit 1 and circuit 2 are both in an ON-state) (in FIG. 2b, "and" of "and/or" is effective).

Mode 4; allowing a robot to operate on the condition that at least one of the switches SW1, SW2 is on (at least circuit 1 or circuit 2 is in an ON-state)(in FIG. 2b, "or" of "and/or" is effective).

In mode 3, same as in mode 1 described above, the operator needs to continue pushing the two levers L1, L2 simultaneously in order to operate the robot, so that it is very hard for the operator to handle other handling members of the teaching operation panel (for example, to handle a jog feeding button). Therefore, mode 4 is adopted, but same as mode 2 described above, mode 4 is not free from the above mentioned risk if trouble happens to contacts of the switches or the circuits including the switches.

Specifically, there is a risk that due to some trouble, a contact or another part of the circuits may malfunction, so that the robot may not be prohibited from operating though the operator stops pushing the lever L1 or L2 (the force application face FS1 or FS2), that is, the deadman switch may not do its most important function.

As described above, in the conventional deadman switch mechanisms, if trouble happens to a contact or another part of a circuit, the possibility that the minimum safety function will not be done is large.

DISCLOSURE OF THE INVENTION

An object of the present invention is to provide a deadman switch and a teaching operation panel provided with a deadman switch in which the possibility of losing a safety function when trouble happens to a contact or another part of a circuit is much reduced, and particularly to provide a teaching operation panel having high safety and good operating property.

A deadman switch mechanism for an emergency stop of a robot according to the present invention comprises: a plurality of switches each having an ON-state and an OFF-state, a switching mechanism for switching the plurality of switches between an ON-state and an OFF-state, and means for outputting a signal to allow a robot to operate on the condition that all of the plurality of switches are in an ON-state. Further, according to the present invention, the switching mechanism includes one or more handling members having an external-operating-force receiving portion exposed outside, handling-member supporting means for supporting those one or more handling members so that those one or more handling members move in accordance with external operating force applied to the external-operating-force receiving portion, and switch turning means linked with all of those one or more handling members for simultaneously turning the plurality of switches to an ON-state/the OFF-state. A linkage mechanism may be adopted as the switch turning means linked with all of the handling members.

Further, the present invention provides a teaching operation panel equipped with the deadman switch mechanism for an emergency stop of a robot, as described above. In a preferable embodiment, a plurality of handling members are provided, and the external-force-receiving portions of the handling members are exposed outside a case of the teaching operation panel at separate positions, for example, near the left and right sides of the case.

According to the present invention, since the means for simultaneously switching the plurality of switches to the ON-state or the OFF-state, and the means for outputting a signal to allow a robot to operate on the condition that all of those plurality of swishes are in the ON-state are provided, the robot is allowed to operate only in the state where the plurality of switches are simultaneously turned into the ON-state by applying the external operating force to any one of the one or more handling members.

Therefore, when the whole switch mechanism operates normally, the robot is allowed to operate by applying external operating force to any one of the one or more handling members, and when failure happens, an emergency stop of the robot can be effected by releasing the external operating force (for example, taking a finger off a lever) as long as at least one of the two switching circuit systems operates normally.

Further, operability and safety of the teaching operation panel can be especially improved by arranging two or more handling members with their external force receiving faces exposed outside at separate positions near the opposite sides of the teaching operation panel.

BRIEF DESCRIPTION OF DRAWINGS

FIGS. 1a and 1b show an example of basic structure of a switch switching mechanism having one switch, adopted in a conventional deadman switch, of which FIG. 1a shows the switch switching mechanism to which external operating force is not applied and FIG. 1b shows the switch switching mechanism to which external operating force is applied;

FIGS. 2a and 2b show an example of basic structure of a switch switching mechanism having two switches, adopted in a conventional deadman switch, of which FIG. 2a shows the switch switching mechanism to which external operating force is not applied and FIG. 2b shows the switch switching mechanism to which external operating force is applied;

FIGS. 3a and 3b show basic structure (a first embodiment) of a switch switching mechanism having two switches, adopted in a deadman switch according to the present invention, of which FIG. 3a shows the switch switching mechanism to which external operating force is not applied and FIG. 3b shows the switch switching mechanism to which external operating force is applied;

FIG. 4 is a schematic view of a deadman switch mechanism in a second embodiment of the present invention;

FIG. 5 is an outside view of a teaching operation panel adopting the deadman switch mechanism shown in FIG. 4 for explaining how to handle the teaching operation panel;

FIGS. 8a to 8d shows examples of the outside shape of the teaching operation panel, referred to as type 1 to type 4;

FIG. 10a is a schematic view of a fifth embodiment;

FIG. 10b is a schematic view of a sixth embodiment;

FIG. 12a is a schematic view of a ninth embodiment;

FIG. 12b is an illustration for explaining how to hold and handle the ninth embodiment;

FIG. 13a is a schematic view of a tenth embodiment;

FIG. 13b is an illustration for explaining how to hold and handle the tenth embodiment;

BEST MODE OF CARRYING OUT THE INVENTION

Figure 3A:
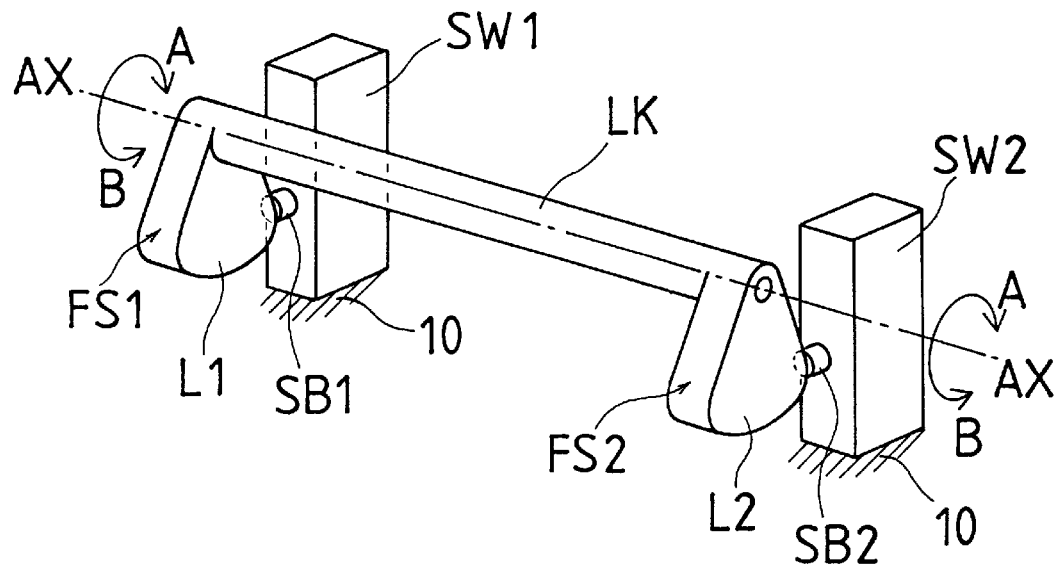
Figure 3B:
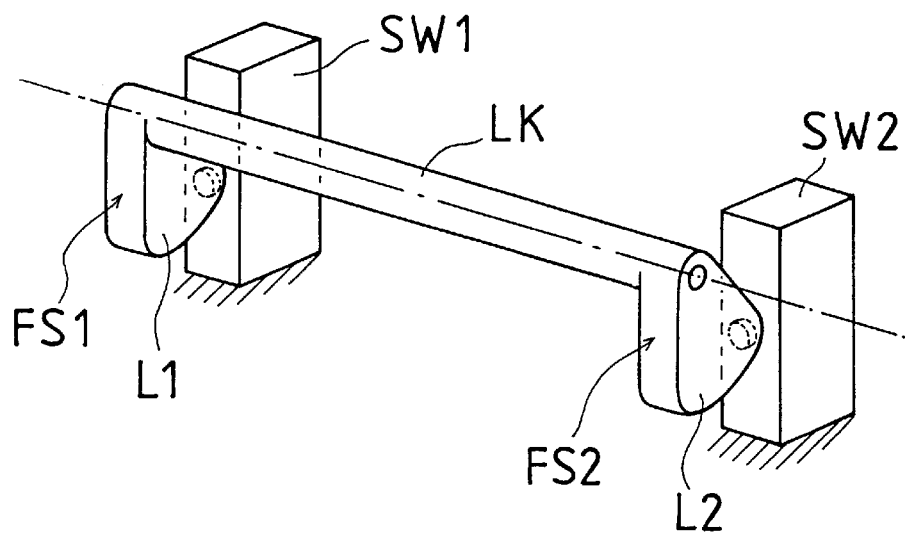

With reference to FIGS. 3a and 3b, an example of basic structure of a switch switching mechanism adopted in a basic embodiment (first embodiment) of the present invention will be described. It is to be noted that in the drawings, similar elements are denoted by the same reference signs when it is appropriate, and that reference signs for denoting the same elements are omitted appropriately.

In the basic structure, two switches SW1, SW2 having switch buttons SB1, SB2 as movable contact elements, respectively, are provided inside a teaching operation panel case 10 (denoted by oblique lines) on the left and the right thereof. The switch button SB1 is brought into an ON- or OFF-state by a lever L1 which is one of handling members, and the other switch button SB2 is brought into an ON- or OFF-state by a lever L2 which is the other of the handling members.

With a known mechanism, the levers L1, L2 which are used to switch the movable contact elements are pivoted to turn around the same one axis AX, integrally connected by a link LK, and biased in the direction denoted by an arrow A by appropriate biasing force. The force application faces FS1, FS2 of the levers L1, L2 to which external operating force is to be applied are exposed outside the teaching operation panel so that an operator can apply external operating force thereto (push the force application faces by finger tips).

Figure 1A:
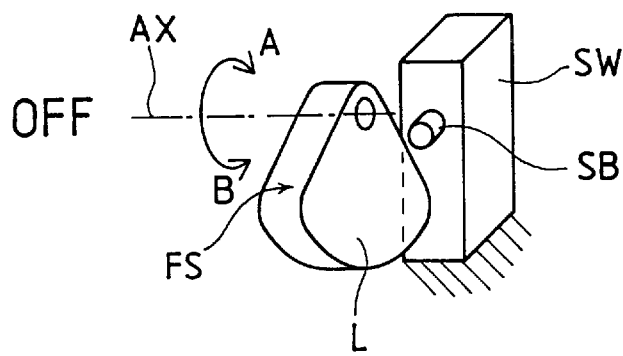
Figure 1B:
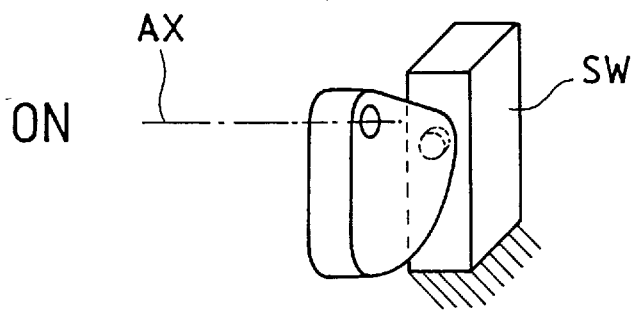
Figure 2A:
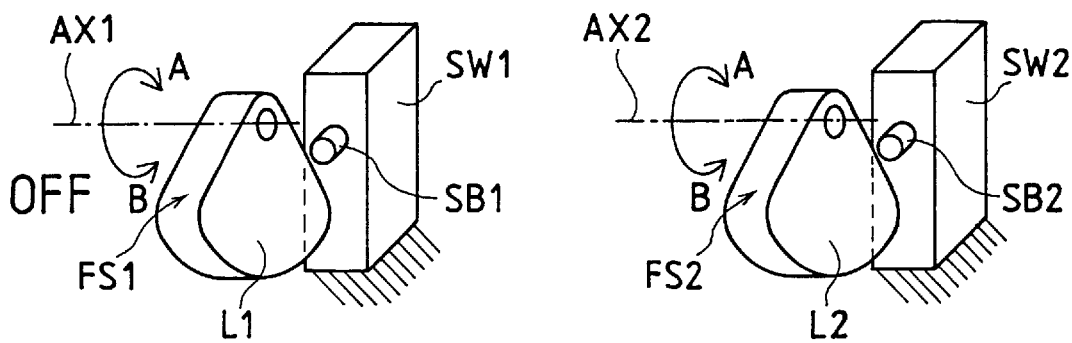
Figure 2B:
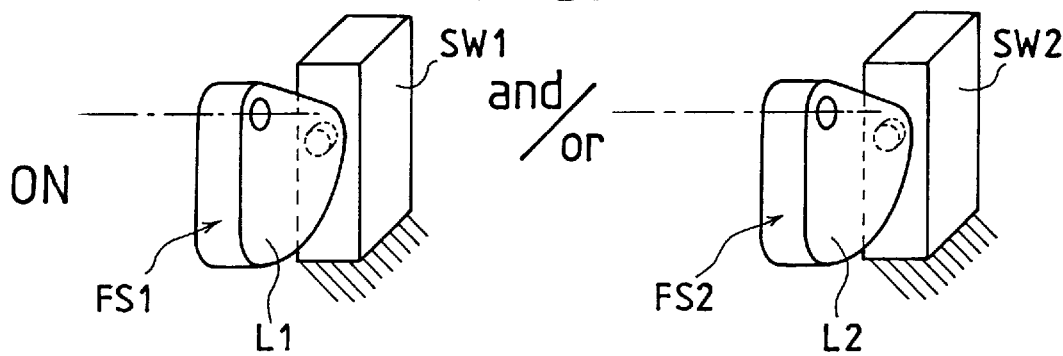

The levers L1, L2 are provided to handle the switches SW1, SW2, respectively, and are in the state shown in FIG. 3a when no external operating force is applied to them (their force application faces FS1, FS2 (the same applies hereinafter)). Unlike the conventional structure shown in FIG. 2, since the levers L1, L2 are connected by the link LK, when the operator applies external operating force to the lever L1, the levers L1, L2 turn in the direction denoted by an arrow B simultaneously, so that the switches SW1, SW2 come into an ON-state as shown in FIG. 3b, simultaneously.

Similarly, when the operator applies external operating force to the lever L2, also the lever L1 turns simultaneously with the lever L2, so that the switches SW1, SW2 come into an ON-state simultaneously, as shown in FIG. 3b. Needless to say, also when the operator applies external operating force to the levers L1, L2 simultaneously, the switches SW1, SW2 come into an ON-state simultaneously.

Conversely, when external operating force is applied to the lever L1 or L2, the levers L1, L2 are in the state shown in FIG. 3b, and when the operator stops applying external operating force to the lever L1 or L2, the levers L1, L2 turn in the direction denoted by an arrow A simultaneously, so that the switches SW1, SW2 come back into an OFF-state as shown in FIG. 3a, simultaneously.

Figures 17A, 17B:
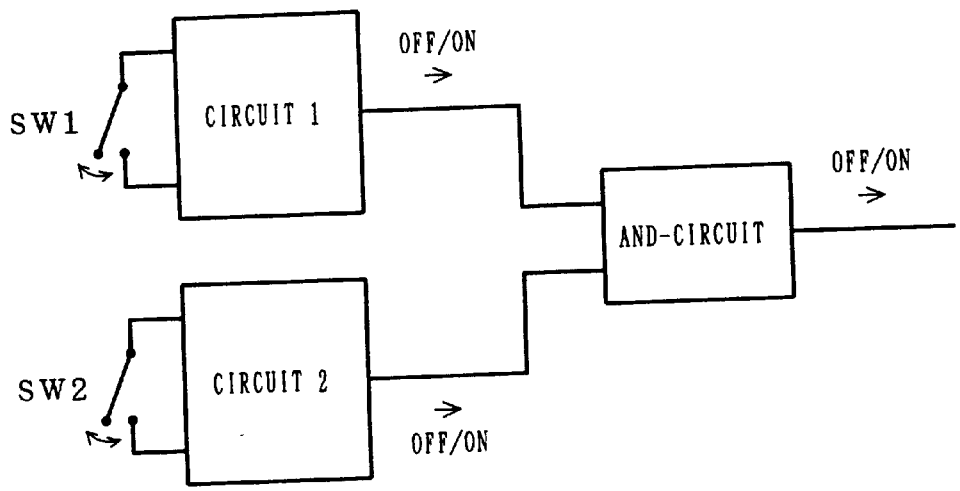
FIG. 17a is a block diagram showing circuit 1 including a switch SW1, circuit 2 including a switch SW2 and a circuit for dealing with signals sent out by circuits 1, 2 which are used in the deadman switch mechanism according to the present invention.
FIG. 17b is a table for explaining the relation between the output of each circuit and the robot's being allowed to operate or prohibited from operating.

The switches SW1, SW2 are included in separate circuits 1, 2, respectively. As shown in FIG. 17a, circuits 1, 2 send out an ON- or OFF-signal, the signals sent out by circuits 1, 2 are subjected to AND process, and based on the result of the AND process, the robot is allowed to operate or prohibited from operating. Specifically, as shown in FIG. 17b, the robot is allowed to operate only when the switches SW1, SW2 are both in an ON-state. Otherwise, the robot is prohibited from operating.

It is to be noted that since the handling members L1, L2, and therefore the switches SW1, SW2 operate in a linked manner, only state 1 or state 2 is produced as long as the whole switch mechanism including circuits 1, 2 operates normally. State 3 or state 4 cannot be produced. However, also in the mechanism of the present invention, state 3 or state 4 may be produced if abnormality happens to the circuits including the switch contacts. In that case, however, since the robot is prohibited from operating, safety function is maintained. If abnormality happens to both circuits 1, 2 simultaneously, the robot may be allowed to operate, but the probability thereof is considered extremely low.

In order to operate the robot, the operator pushes at least one of the force application faces FS1, FS2 of the levers L1, L2 connected by the link LK to turn the levers L1, L2 in the direction denoted by an arrow B simultaneously to thereby push the switch buttons SB1, SB2 simultaneously as shown in FIG. 3b.

In that state, circuit 1 including the switch SW1 and circuit 2 including the switch SW2 each send out an ON-signal. Those ON-signals are subjected to AND process, and based on the result of the AND process, the robot is allowed to operate. Thus, the operator can operate the robot. Maintaining the state of FIG. 3b, the operator can continue operating the robot.

When the operator wants to stop operating the robot because he feels danger while operating the robot or for another reason, the operator only needs to stop pushing the levers L1, L2 (the force application faces FS1, FS2) connected by the link LK (for example, take his finger tips off). Then the levers L1, L2 come back into the state of FIG. 3a, so that the robot is prohibited from operating and stops immediately.

Figure 6A:
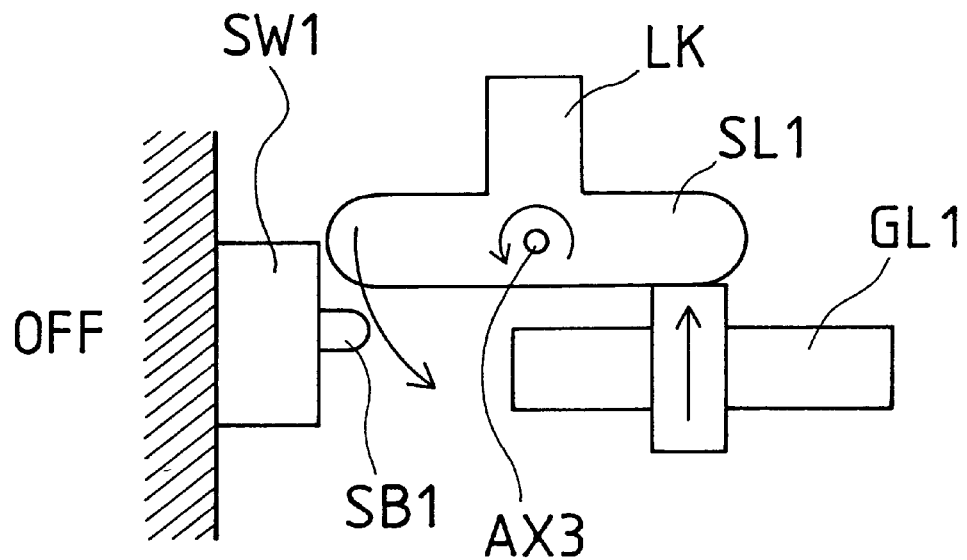
FIGS. 6a and 6b are views of a switch SW1 and its surrounding portion as viewed in the direction VP denoted in FIG. 4, of which FIG. 6a relates to an OFF-state and FIG. 6b relates to an ON-state.
Figure 6B:
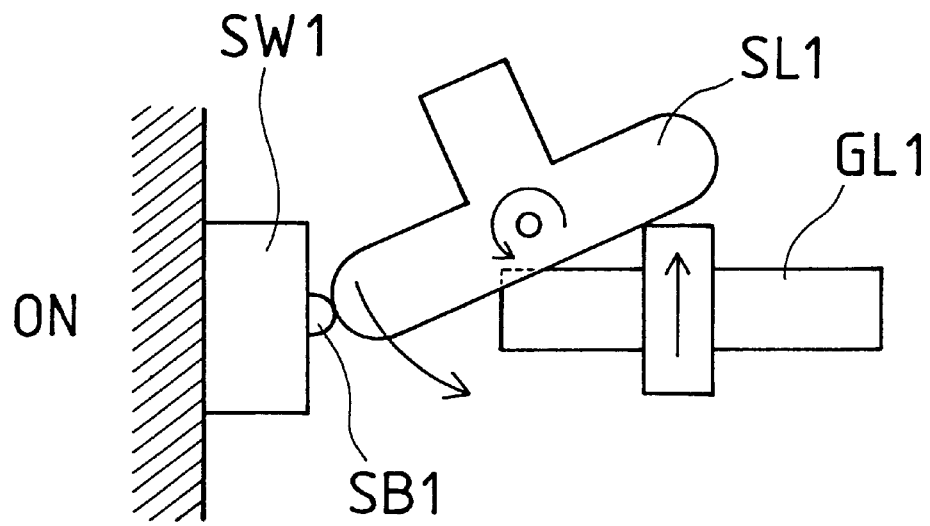
Figure 7A:
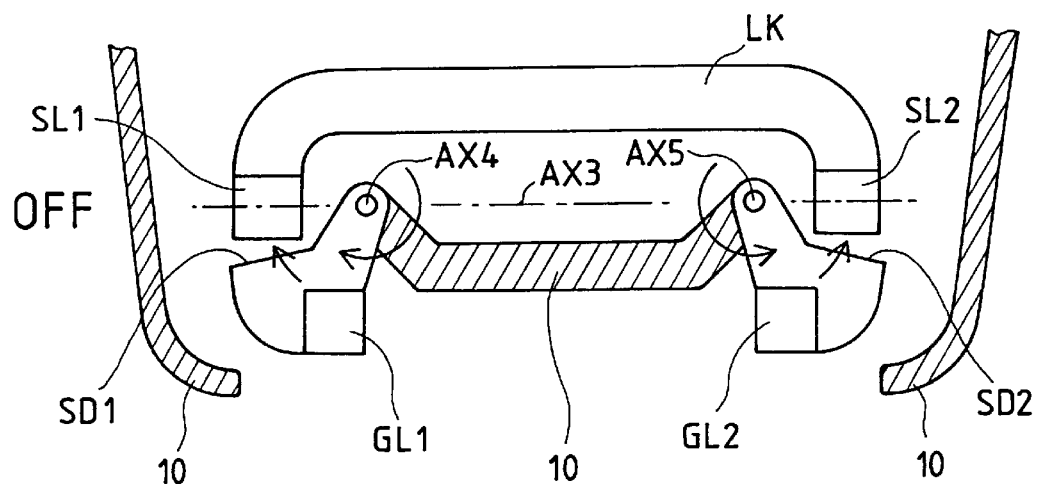
FIGS. 7a and 7b are schematic views as viewed in the direction VQ denoted in FIG. 4, of which FIG. 7a relates to an OFF-state and FIG. 7b relates to an ON-state.
Figure 7B:
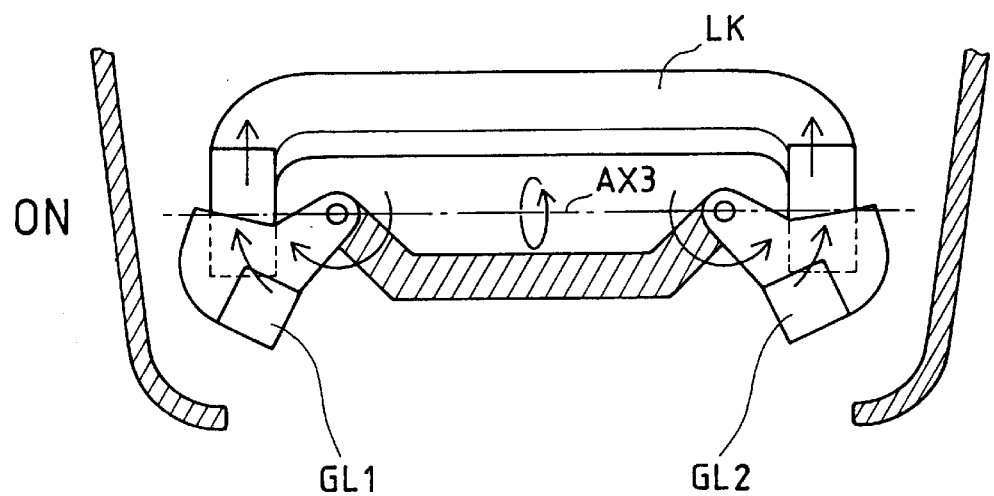

In the basic structure shown in FIGS. 3a and 3b, the levers L1, L2 which are handling members directly operate on the switches. Generally, it is possible to provide operating members which operate on the switches, apart from handling members and to link the handling members and the operating members by an appropriate link mechanism. FIGS. 4 to 7 are illustrations for explaining such embodiment (second embodiment), of which FIG. 4 is a schematic view of a mechanism, FIG. 5 is an outside view of a teaching operation panel adopting the second embodiment for explaining how to handle the teaching operation panel, FIG. 6 are views of a switch SW1 and its surrounding portion as viewed in the direction VP denoted in FIG. 4, and FIG. 7 are schematic views as viewed in the direction VQ denoted in FIG. 4. FIG. 6a and FIG. 7a relate to an OFF-state, and FIG. 6b and FIG. 7b relate to an ON-state.

In the present embodiment of which the whole structure is mainly shown in FIGS. 4 and 7, two switches SW1, SW2 having switch buttons SB1, SB2 as movable contact elements, respectively, are provided inside a teaching operation panel case 10 at its front portion (on the side remote from an operator who is handling the teaching operation panel) on the left and the right thereof. The switch button SB1 is brought into an ON- or OFF-state by a slave lever SL1, and the other switch button SB2 is brought into an ON- or OFF-state by the other slave lever SL2.

With a known mechanism, the slave levers SL1, SL2 which switch the movable contact elements SB1, SB2 are pivoted to turn around the same one axis AX3, integrally connected by a link LK, and biased in the direction denoted by an arrow A by appropriate biasing force.

In the present embodiment, an operator does not apply external operating force directly to the slave levers SL1, SL2. Instead, torque is applied to the slave levers SL1, SL2 in the direction denoted by an arrow B through grip levers GL1, GL2 which are provided as handling members. With known mechanisms, the grip levers GL1, GL2 are pivoted to turn around axes AX4, AX5 which are parallel to each other, respectively.

The grip levers GL1, GL2 have shoulder portions SD1, SD2, respectively, and through the shoulder portions SD1, SD2, the grip levers GL1, GL2 drive the slave levers SL1, SL2.

In order to handle a teaching operation panel 1 provided with the present mechanism, the operator holds the case 10 of the teaching operation panel 1 provided with a display DP, for example, as shown in FIG. 5. When external operating force is not applied to the grip lever GL1 or GL2, the grip levers GL1, GL2 are in a state shown in FIG. 7a. When the operator applies normal external operating force to the grip lever GL1 (grips the grip lever GL1 with normal force), for example, by his left hand HL, the grip lever GL1 turns around the axis AX4, and the shoulder portion SD1 of the grip lever GL1 drives the slave lever SL1 to turn around the axis AX3 in the direction denoted by an arrow B.

As a result, the switch button SB1 which a movable contact element of the switch SW1 is pushed and the switch SW1 is brought into an ON-state, as shown on an extended scale in FIGS. 6a and 6b. The slave lever L2 connected with the slave lever SL1 by the link LK also turns similarly along with the slave lever SL1, so that the switch SW2 is brought into an ON-state.

Also when the operator applies normal external operating force to the grip lever GL2 by his right hand HR (grips the grip lever GL2 with normal force), the switches SW1, SW2 are brought into an ON-state simultaneously, with the same mechanism.

Conversely, when external operating force is applied to the grip lever GL1 or GL2, the grip levers GL1, GL2 are in a state shown in FIGS. 6b and 7b, and when the operator stops applying external operating force, the slave levers SL1, SL2 turn in the direction denoted by an arrow A simultaneously, so that the switches SW1, SW2 come back into an OFF-state as shown in FIGS. 6a and 7a, simultaneously.

Same as in the first embodiment, the switches SW1, SW2 are included in separate circuits 1, 2, respectively. As shown in FIG. 17a, circuits 1, 2 send out an ON- or OFF-signal, the signals sent out by circuits 1, 2 are subjected to AND process, and based on the result of the AND process, the robot is allowed to operate or prohibited from operating. Specifically, as already explained with reference to FIG. 17b, the robot is allowed to operate only when the switches SW1, SW2 are both in an ON-state. Otherwise, the robot is prohibited from operating.

Also in the present embodiment, since the slave levers SL1, SL2 which operate on the switches operate in a linked manner, and therefore the switches SW1, SW2 operate in a linked manner, only state 1 or state 2 is produced as long as the whole switch mechanism including circuits 1, 2 operates normally. State 3 or state 4 cannot be produced.

State 3 or state 4 may be produced if abnormality happens to the circuits including the switch contacts. In that case, however, since the robot is prohibited from being operated, safety function is maintained. If abnormality happens to both circuits 1, 2 simultaneously, the robot may be allowed to operate, but the probability thereof is considered extremely low.

In order to operate the robot, the operator holds the teaching operation panel case 10 as shown in FIG. 5, and applies gripping force at least one of the grip levers GL1, GL2 to turn the slave levers SL1, SL2 in the direction denoted by an arrow B simultaneously to thereby push the switch buttons SB1, SB2 simultaneously as shown in FIGS. 6b and 7b.

In that state, circuit 1 including the switch SW1 and circuit 2 including the switch SW2 each send out an ON-signal. Those ON-signals are subjected to AND process, and based on the result of the AND process, the robot is allowed to operate. Thus, the operator can operate the robot. Maintaining the state shown in FIGS. 6b and 7b, the operator can continue operating the robot.

When the operator wants to stop operating the robot because he feels danger while operating the robot or for another reason, the operator only needs to stop applying gripping force to the grip lever GL1 or GL2. Then the slave levers SL1, SL2 turn in the direction denoted by an arrow A simultaneously, and the switches SW1, SW2 comes back into an OFF-state as shown in FIGS. 6a and 7a, so that the robot is prohibited from operating and stops immediately.

In the two embodiments described above, two sets of a switch, an operating member, a handling member and the like are arranged on the left and the right of the teaching operation panel, but other various arrangements can be also adopted. Further, the overall shape of the teaching operation panel (or the case thereof) to which the present invention can be applied can be varied. It is desirable to plan the arrangement of mechanical parts, particularly of handling members flexibly, according as the overall shape is varied.

Type 1 to type 4 shown in FIGS. 8a to 8d are typical examples of the overall shape of a teaching operation panel (or a case thereof). Arrangements of a switch mechanism suitable for those types will be described as third to thirteenth embodiments with reference to FIGS. 9 to 16, in order. Description will be made simply in an itemizing manner. In FIG. 8, reference sign DP denotes a display, KY a keyboard (including various handling buttons), and BH1 and BH2 holding handles.

Figure 9B:
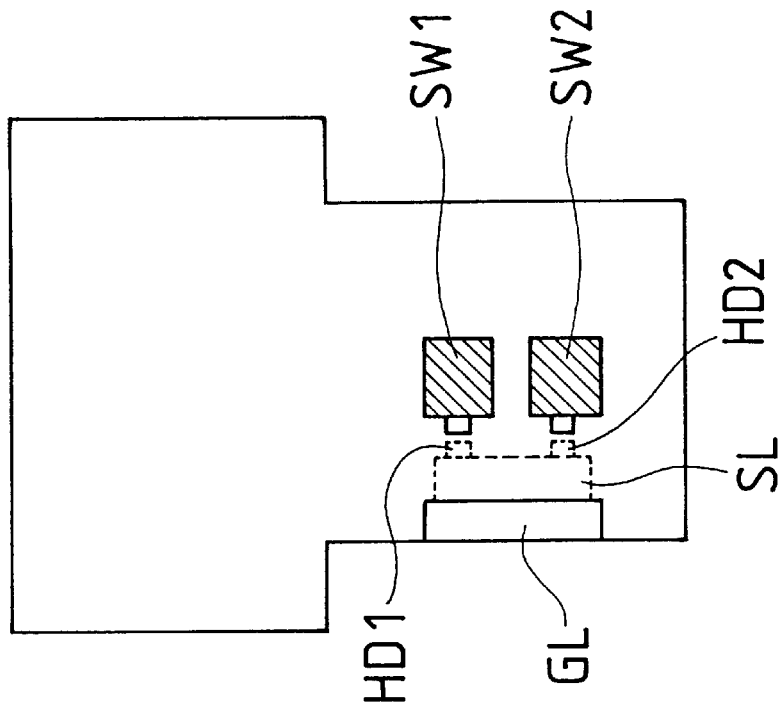
FIG. 9b is a schematic view of a fourth embodiment.
Figure 9A:
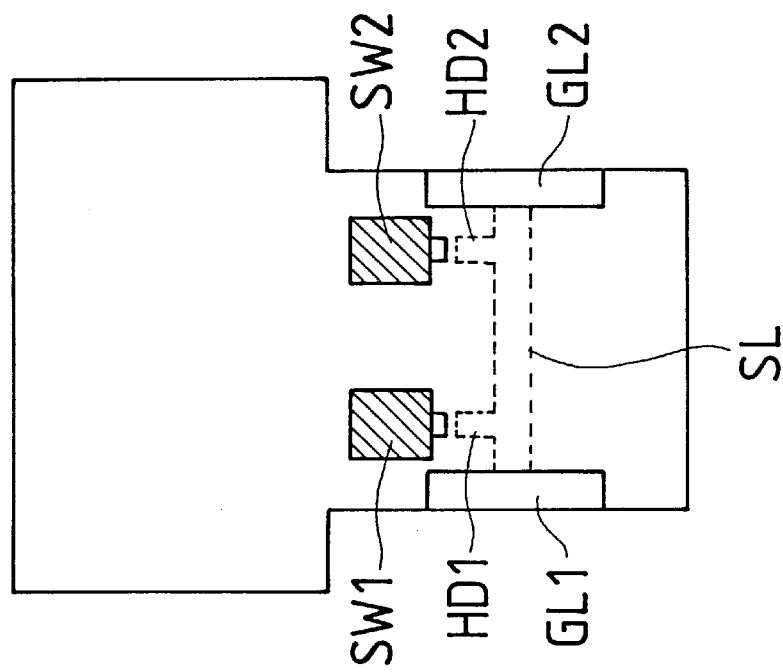
FIG. 9a is a schematic view of a third embodiment.

[FIG. 9a; Applied to Type 1/Third Embodiment]

Two grip levers GL1, GL2 are arranged at the rear portion of the case (on the side closer to the operator) at both side-portions thereof to turn one slave lever SL. Two heads HD1, HD2 of the slave lever SL bring two switches SW1, SW2 into an ON- or OFF-state simultaneously.

[FIG. 9b; Applied to Type 1/Fourth Embodiment]

One grip lever GL is arranged at the rear portion of the case (on the side closer to the operator) at a side-portion thereof to turn one slave lever SL. Two heads HD1, HD2 of the slave lever SL bring two switches SW1, SW2 into an ON- or OFF-state simultaneously.

[FIG. 10a; Applied to Type 1/Fifth Embodiment]

Two grip levers GL1, GL2 are arranged at the central portion of the case at both side-portions thereof to turn one slave lever SL. Two heads HD1, HD2 of the slave lever SL bring two switches SW1, SW2 into an ON- or OFF-state simultaneously.

[FIG. 10b; Applied to Type 1/Sixth Embodiment]

One grip lever GL is arranged at the central portion of the case at a side-portion thereof to turn one slave lever SL. Two heads HD1, HD2 of the slave lever SL bring two switches SW1, SW2 into an ON- or OFF-state simultaneously.

Figure 11B:
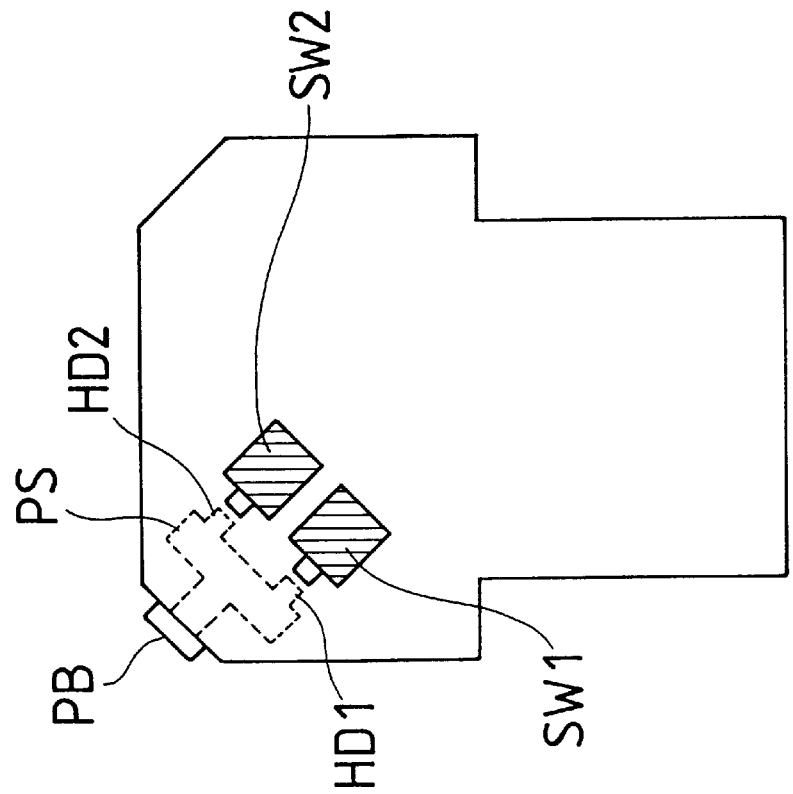
FIG. 11b is a schematic view of a eighth embodiment.
Figure 11A:
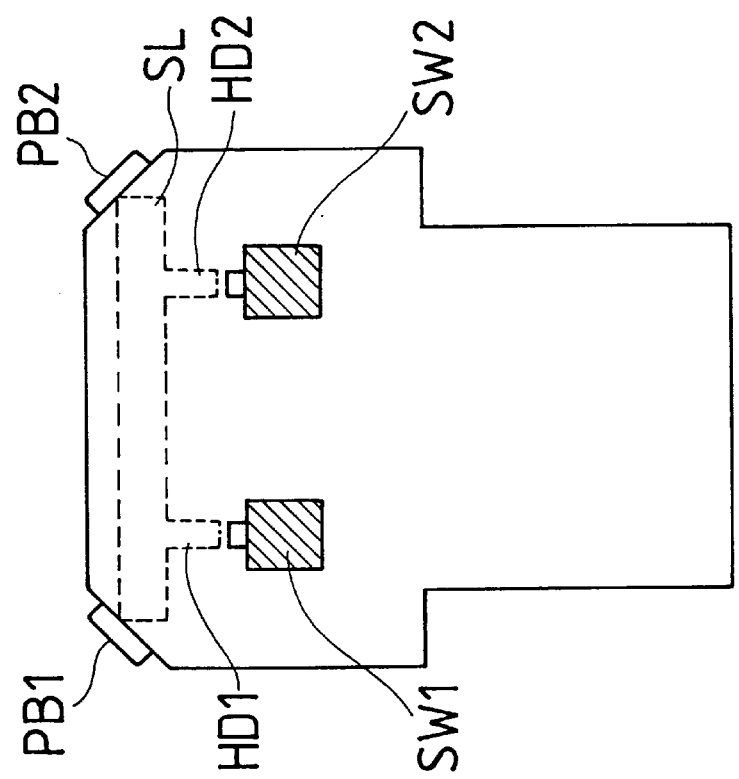
FIG. 11a is a schematic view of a seventh embodiment.

[FIG. 11a; Applied to Type 1/Seventh Embodiment]

Two handling buttons PB1, PB2 are arranged at both front corner portions of the case to turn one slave lever SL. Two heads HD1, HD2 of the slave lever SL bring two switches SW1, SW2 into an ON- or OFF-state simultaneously.

[FIG. 11b; Applied to Type 1/Eighth Embodiment]

One handling button PB is arranged at a front corner portion of the case to slide one sliding slave member PS. Two heads HD1, HD2 of the sliding slave member PS bring two switches SW1, SW2 into an ON- or OFF-state simultaneously.

[FIGS. 12a and 12b; Applied to Type 4/Ninth Embodiment]

As shown in (a), grip levers GL1, GL2 are arranged at inside portions of holding handles BH1, BH2, respectively, to turn one slave lever SL. Two heads HD1, HD2 of the slave lever SL bring two switches SW1, SW2 into an ON- or OFF-state simultaneously. The operator handles one (or both) of the grip levers GL1, GL2 by his left or/and right hands as shown in (b).

[FIGS. 13a and 13b; Applied to Type 2/Tenth Embodiment]

As shown in (a), openings OP1, OP2 are formed in both side-portions of the case, and grip levers GL1, GL2 are arranged beside the openings, respectively, to turn one slave lever SL. Two heads HD1, HD2 of the slave lever SL bring two switches SW1, SW2 into an ON- or OFF-state simultaneously. The operator handles one (or both) of the grip levers GL1, GL2 by his left or/and right hands using the openings OP1, OP2 as shown in (b).

Figure 14A:
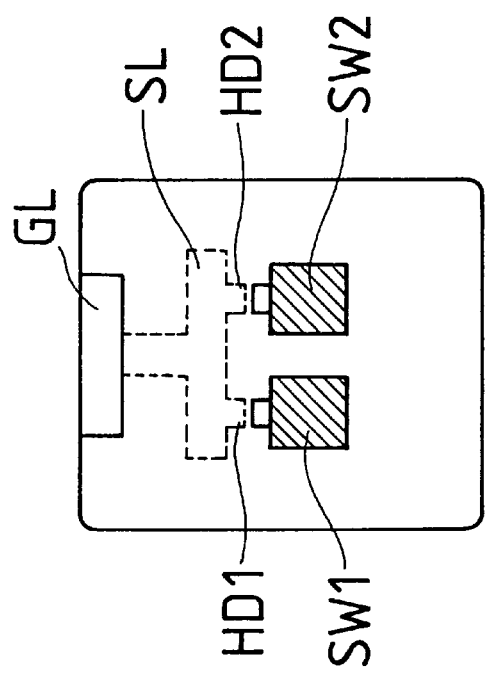
FIG. 14a is a schematic view of an eleventh embodiment.
Figure 14B:
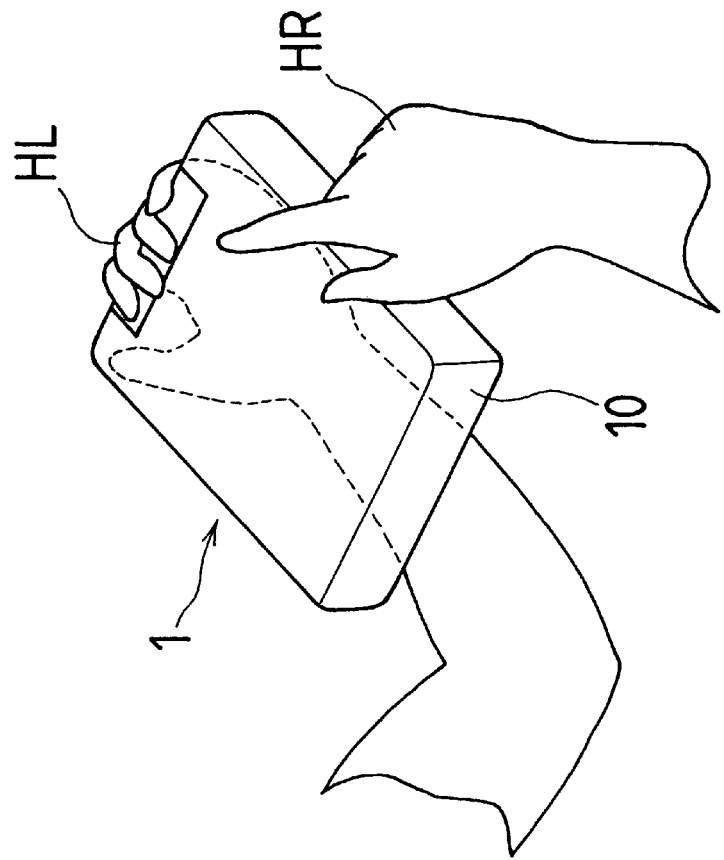
FIG. 14b is an illustration for explaining how to hold and handle the eleventh embodiment.

[FIGS. 14a and 14b; Applied to Type 3/Eleventh Embodiment]

As shown in FIG. 14a, one grip lever GL is arranged at the front end of the case to turn one slave lever SL. Two heads HD1, HD2 of the slave lever SL bring two switches SW1, SW2 into an ON- or OFF-state simultaneously. The operator handles the grip lever GL, for example, by his left hand HL as shown in FIG. 14b.

Figure 15A:
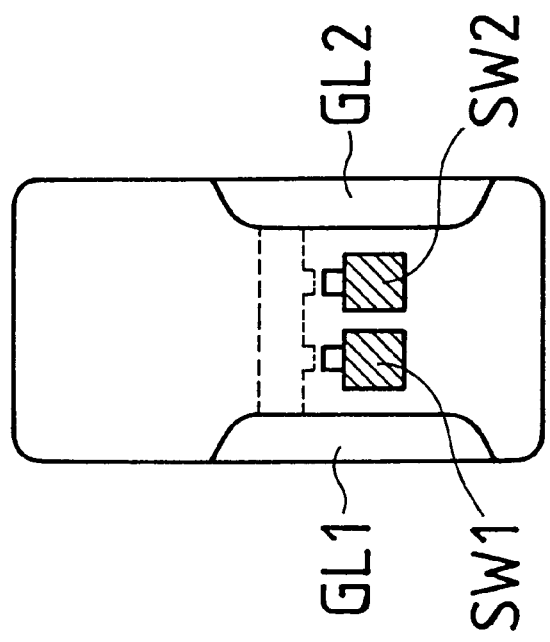
FIG. 15a is a schematic view of a twelfth embodiment.
Figure 15B:
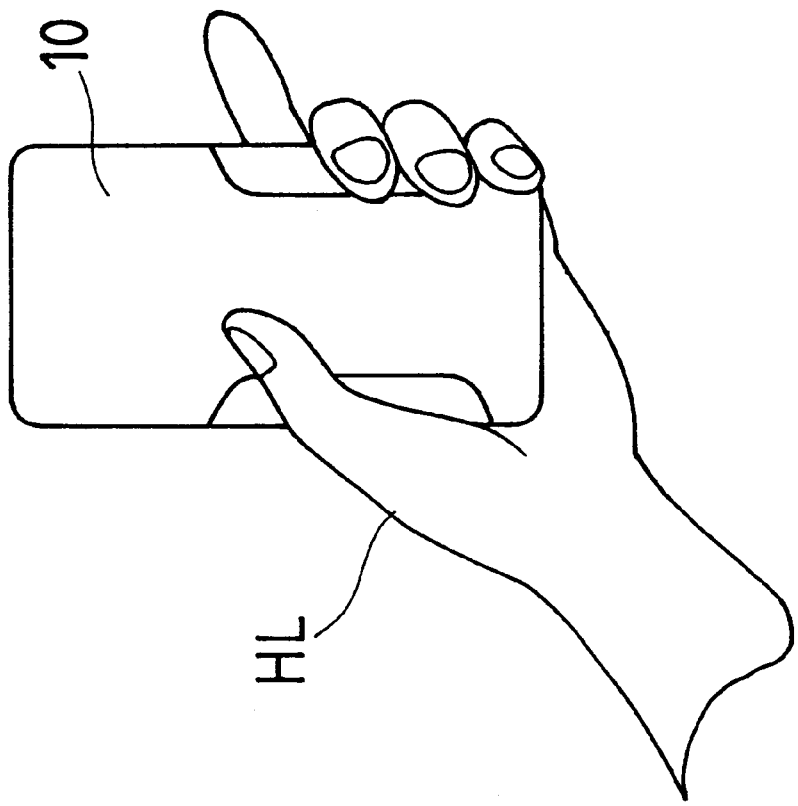
FIG. 15b is an illustration for explaining how to hold and handle the twelfth embodiment.

[FIGS. 15a and 15b; Applied to Type 3/Twelfth Embodiment]

This is an example in which the present invention is applied to a small hand-size teaching operation panel. As shown in FIG. 15a, grip levers GL1, GL2 are arranged at both side-portions of the case, respectively, to turn one slave lever SL. Two heads HD1, HD2 of the slave lever SL bring two switches SW1, SW2 into an ON- or OFF-state simultaneously. The operator holds the case in a manner that the case is wrapped, for example, in his left hand BL, and handles the grip lever GL1, as shown in FIG. 15b.

Figure 16B:
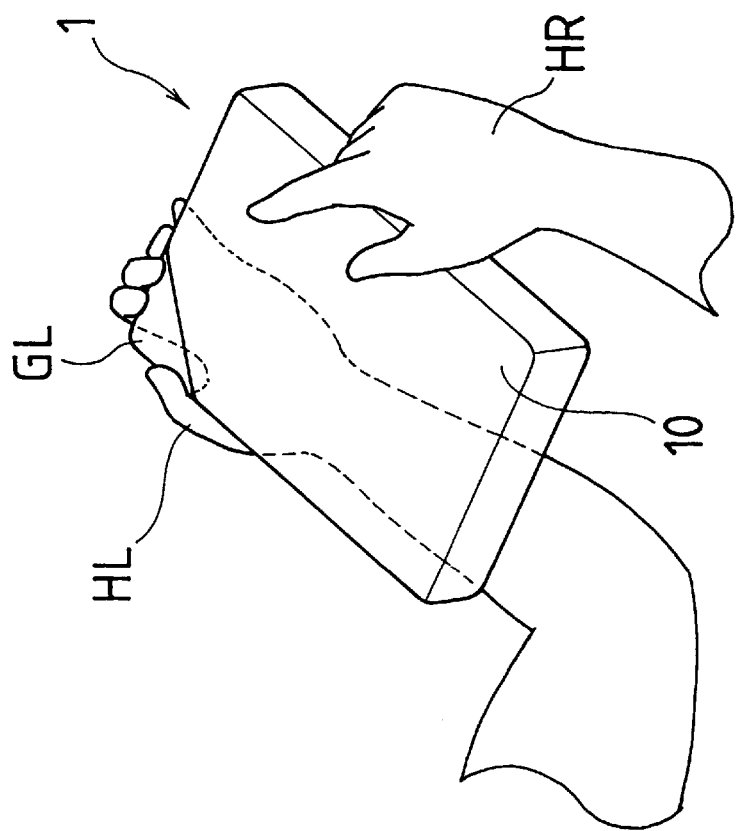
FIG. 16b is an illustration for explaining how to hold and handle the thirteenth embodiment.
Figure 16A:
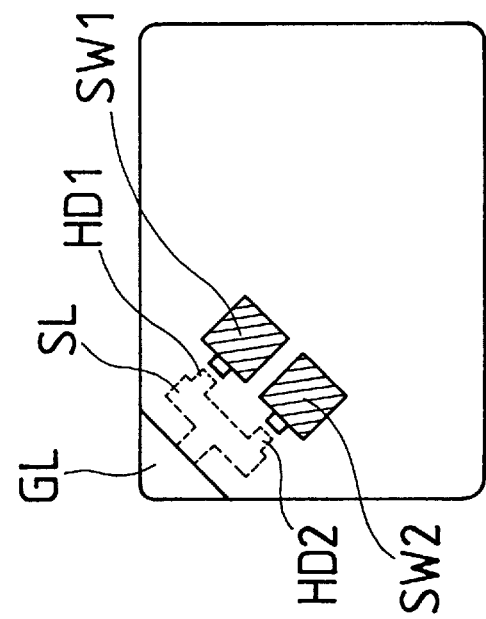
FIG. 16a is a schematic view of a thirteenth embodiment.

[FIGS. 16a and 16b; Applied to Type 3/Thirteenth Embodiment]

One grip lever GL is arranged at a front corner portion of the case to turn one slave lever SL. Two heads HD1, HD2 of the slave lever SL bring two switches SW1, SW2 into an ON- or OFF-state simultaneously. The operator handles the grip lever GL, for example, by his left hand HL and handles another member by his free right hand HR.

The above types of teaching operation panel and arrangements suitable thereto have been described only by way of example. It goes without saying that the switch mechanism for an emergency stop of a robot according to the present invention can be applied to a deadman switch mechanism included in another type of teaching operation panel.

All the embodiments described above are examples in which two switches are provided, but it goes without saying that if necessary, the number of switches and the number of circuits can be increased in order to reduce the possibility that all the switch-circuit systems break down simultaneously.

In the present invention, when the whole switch mechanism operates normally, the robot is allowed to operate by applying external operating force to any one of one or more handling members, and when trouble happens to the switch mechanism, an emergency stop of the robot can be effected by stopping applying external operating force (for example, taking a finger tip off a lever) as long as at least one of the two switch-circuit systems operates normally. Thus, the safety of the deadman switch is improved without harming its operating property.

The operating property and safety of the teaching operation panel is especially improved when two or more handling members are provided with their force application faces being exposed outside at separate positions near the opposite sides of the teaching operation panel.

What is claimed is:

1. A deadman switch mechanism for an emergency stop of a robot, comprising:

a plurality of switches each having an ON-state and an OFF-state;

switching means for switching said plurality of switches between the ON-state and the OFF-state; and means for outputting a signal for allowing a robot to operate on the condition that all of said plurality of switches are in the ON-state, wherein said switching means includes at least one handling member having an external-operating-force receiving portion exposed outside, a handling-member supporting member for supporting said at least one handling member so that said at least one handling member moves in accordance with an external operating force applied to said external-operating-force receiving portion, and a switch turning member linked with all of said at least one handling member, for simultaneously turning said plurality of switches to the ON state/the OFF-state.

2. A deadman switch mechanism for an emergency stop of a robot according to claim 1, wherein a plurality of handling members are provided as said at least one handling member.

3. A deadman switch mechanism for an emergency stop of a robot according to claim 1, said switch turning means is a linkage mechanism linked with all of said at least one handling member.

4. A teaching operation panel having a deadman switch mechanism for an emergency stop of a robot, said deadman switch mechanism for an emergency stop of a robot comprising: a plurality of switches each having an ON-state and an OFF-state; switching means for switching said plurality of switches between an ON-state and an OFF-state; and means for outputting a signal to allow a robot to operate on the condition that all of said plurality of switches are in the ON-state, wherein said switching means includes at least one handling member having an external-operating-force receiving portion exposed outside, a handling-member supporting member for supporting said at least one handling member so that said at least one handling member moves in accordance with an external operating force applied to said external-operating-force receiving portion, and a switch turning member linked with all of said at least one handling member, for simultaneously turning said plurality of switches to the ON-state/the OFF-state.

5. A deadman switch mechanism for an emergency stop of a robot according to claim 4, wherein a plurality of handling members are provided as said at least one handling member.

6. A deadman switch mechanism for an emergency stop of a robot according to claim 5, wherein the external-operating-force receiving portions of said plurality of handling members are exposed outside a case of said teaching operation panel at separate positions.

7. A teaching operation panel according to claim 6, wherein said plurality of handling members comprises two handling members arranged on the left and the right of said teaching operation panel, respectively, and the force application portions of said handling members are exposed outside the case of said teaching operation panel on the left and the right thereof.

8. A deadman switch mechanism for an emergency stop of a robot, comprising:

a plurality of switches each being switched between an ON-state and an OFF-state;

swiching means for simultaneously switching all of said plurality of switches from the ON-state to the OFF-state, or from the OFF-state to the ON-state in response to an operating force from an operator; and means for outputting a signal for allowing a robot to operate on the condition that all of said plurality of switches are in the ON-state.

9. A deadman switch mechanism according to claim 8, wherein said switching means includes a plurality of turning members respectively provided for said plurality of switches and to operate directly on said plurality of switches, a link member for mechanically linking said turning members, and at least one handling member for receiving the operating force from the operator and transmitting said operating force to said link member.

* * * * *